June 14, 1949.  H. M. KULMAN  2,473,030
COMPOSITION COMPRISING A CO-POLYMER OF VINYL
CHLORIDE-VINYL ACETATE AND GROUND PEANUT
HULLS AND METHOD OF MAKING SAME
Filed Jan. 7, 1943  2 Sheets-Sheet 1
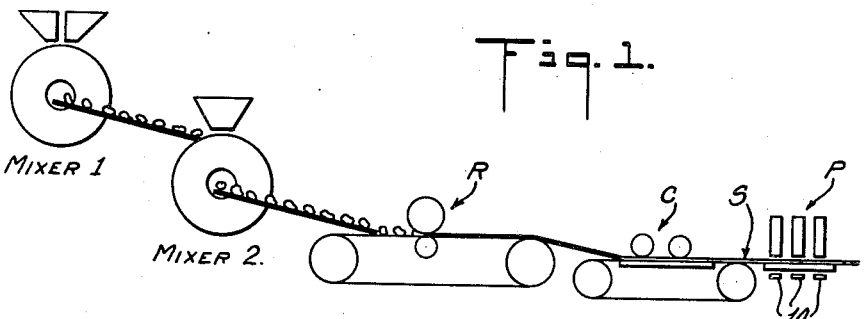
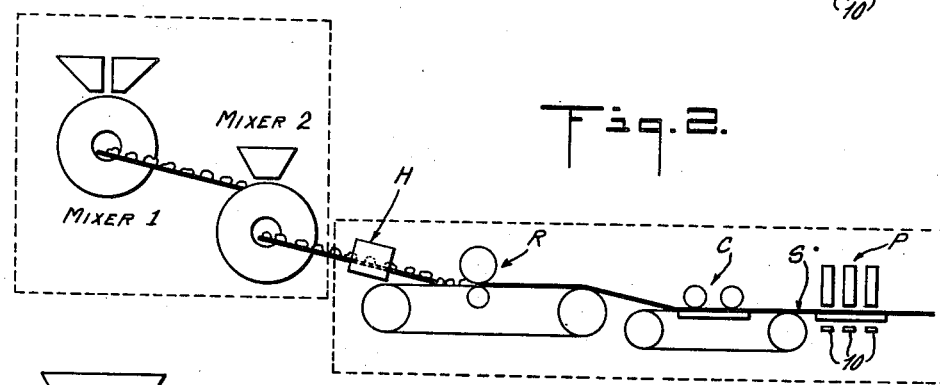
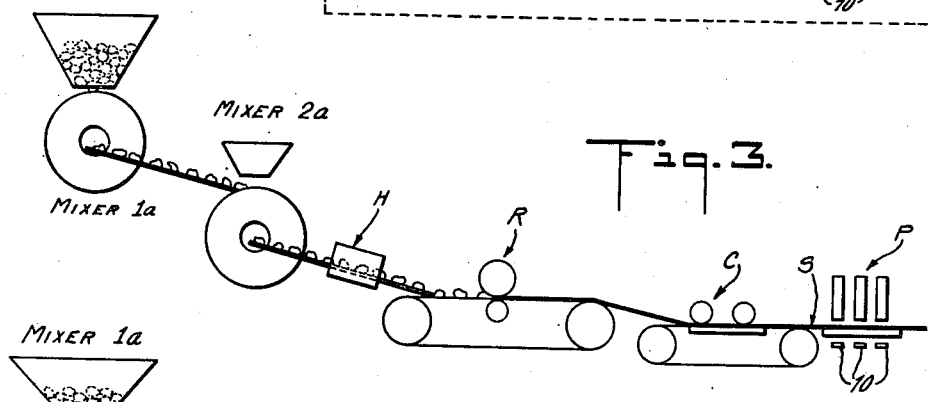
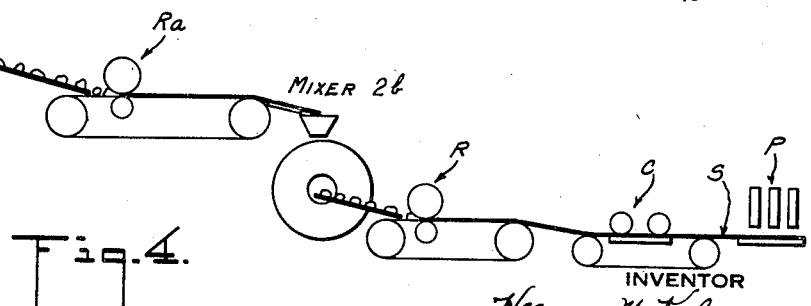
INVENTOR
Herman M. Kulman
BY Kenyon & Kenyon
ATTORNEYS June 14, 1949.  H. M. KULMAN  2,473,030
COMPOSITION COMPRISING A CO-POLYMER OF VINYL
CHLORIDE-VINYL ACETATE AND GROUND PEANUT
HULLS AND METHOD OF MAKING SAME
Filed Jan. 7, 1943  2 Sheets-Sheet 2
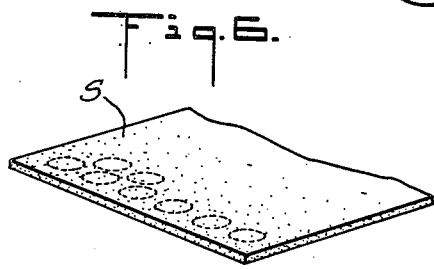
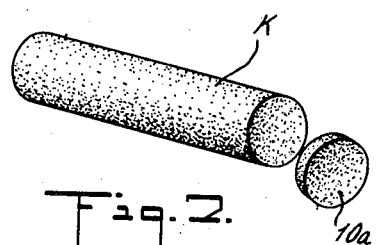
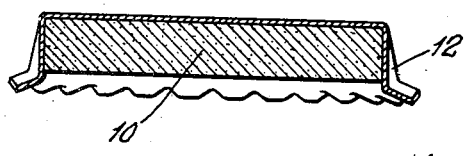
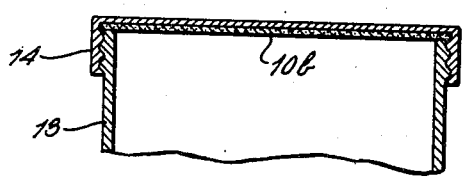
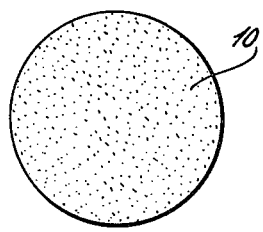
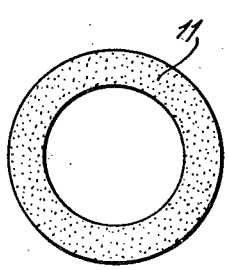
INVENTOR
Herman M. Kulman
BY
Kenyon & Kenyon
ATTORNEYS Patented June 14, 1949

2,473,030

UNITED STATES PATENT OFFICE 2,473,030

COMPOSITION COMPRISING A COPOLYMER OF VINYL CHLORIDE-VINYL ACETATE AND GROUND PEANUT HULLS AND METHOD OF MAKING SAME

Herman M. Kulman, Atlanta, Ga., assignor to Kulastic Company, Inc., Atlanta, Ga., a corporation of Georgia Application January 7, 1943, Serial No. 471,563

4 Claims. (Cl. 260—17.4)

The present invention relates to a composition of matter and processes for the production thereof. More particularly it relates to the production of linings. Such material especially suited for use with closures of the crown type used in the bottling of carbonated beverages. The application is a continuation in part of my co-pending application, Serial No. 416,781, filed October 28, 1941, now Patent 2,341,925.

The dearth of cork in the bottling art because of its diversion for use in critical war industries is well known. This has created great demand for an adequate new gasket material that would be available in large quantities at favorable cost and having equivalent, if not superior, characteristics to cork.

In the capping of bottles, particularly with present crowning machines which clamp a crown cap or cover over a bottle mouth, the crown gasket must have sufficient elasticity or resiliency to prevent bottle damage by crowning-machine pressures running as high as 800 pounds per square inch. The gasket material, also, must possess sufficient resiliency to recover, i. e., to tend to return to its original shape on the bottle after the crowning pressure is removed in order that an effective leakproof sealing of the contents may be maintained by the crown-held gasket. If these conditions are not fulfilled adequately, the carbonated contents become "flat" in a very short time. It is a common experience at the present time for consumers to find their carbonated beverages "flat" when the bottles are opened because the bottler has utilized inferior cork substitutes in the crown caps.

There are other properties which a satisfactory lining material for crown and other stoppers or packings of all sizes and kinds and types designed to replace cork, or rubber or other prefabricated materials now used for such purposes must possess.

1. It should be light.
2. It should not have taste-imparting properties to impair the flavor of bottled contents, nor should it have any coloring effect. It should not be toxic.
3. It should contain no foreign matter or materials likely to fall into the bottled beverages and contaminate the latter.
4. It should be impervious to water and be unaffected by carbon dioxide ($CO_2$) gas or other gases.
5. It should be available commercially in quantity at favorable cost and be unlikely to come under restrictions entailed by the national emergency.
6. It should, also, be impervious and/or resistant to acids in solution and should not disintegrate readily in liquids.

It is an object of this invention to provide gaskets and gasket material fulfilling the foregoing requirements.

Another object of this invention is to provide gaskets or cushions and material therefor which may be utilized with crown covers extant and hence used on all presently-known makes of crowning machinery without any changes or adjustments thereof.

A further object is to provide gasket material from which the gaskets or cushions can be manufactured simply, cheaply and in quantity, and to develope a synthetic or fabricated gasket material to replace natural or presently used gasket material.

A further object of this invention is to provide novel methods of preparing the gasket material.

Still another object of the invention is to provide a composition of matter of general utility, for example, in the manufacture of gaskets useful with caps for tubular containers, sealing rings useful with jars, washers for use with couplings of cold conduits, floor covering, linings, bed pads to replace rubber pads, weather stripping and gaskets of all natures having desirable sealing properties against pressure, and corrosives and having numerous other applications, wherein resiliency and resistance to moisture are desirable characteristics.

Other applications of the composition of matter herein described are for use as paddings or cushions on printing presses to replace rubber cushions; for use as automotive, nautical or aeronautical gaskets e. g. for headlight gaskets or distributor gaskets to replace cork, rubber or other fabricated gaskets now used; for use as gasket material in washing machines; for use as water-proof linings for shell and ammunition boxes as a protection against salt spray and sea air; for use as deck coverings; for use as wall liners; for use as liners for carpets or rugs in place of present "Ozite" friction pads or cushions, and for use as shell wadding. It is not necessary, of course, with all the applications specified that non-toxic characteristics be preserved. Accordingly, it is permissible to substitute synthetic resins and plastics other than those of a non-toxic nature in many instances provided that such resins or plasticizers produce equivalent results to those herein specified. The material can also be used for wire insulation.

Another material object of this invention is to provide a composition of matter which may be manufactured without waste, i. e., a material in which the residue resulting from formation of any particular shapes may be reutilized simply by recalendering or repressing the residue or scrap with the resultant tremendous savings of materials.

The composition of matter embodies nut shells, preferably peanut shells, suitable clays, and suitable binders mixed and prepared in proportions hereinafter to be described.

To the accomplishment of the foregoing and such other objects as may hereinafter appear, the invention consists in the novel composition of matter, methods of preparing the same, and constructions and arrangements of parts hereinafter to be described and then sought to be defined in the appended claims, reference being had to the accompanying drawings forming a part hereof, and which show, merely for the purposes of illustrative disclosure, preferred embodiments of the invention, it being expressly understood, however, that various changes may be made in practice within the scope of the claims without digressing from the inventive idea.

In the drawings in which similar reference characters denote corresponding parts:

Figures 1 to 5 inclusive illustrate diagrammatically the method and variations thereof useful for the preparation of the composition of matter;

Figs. 6 and 7 illustrate diagrammatically various methods of preparing discs of the composition of matter, respectively from sheets and rods thereof;

Fig. 8 is a transverse vertical section through a crown cap embodying a gasket of the composition of matter herein disclosed;

Fig. 9 is a similar transverse sectional view through another type of cap closure embodying a gasket of the composition of matter herein disclosed; and Figs. 10 and 11 are plan views of gaskets useful with the cap closure of Fig. 8 or with other cap closures.

In the preparation of the composition of matter, the following formulae have been found acceptable:

Example 1

| | Per cent by weight |
|---|---|
| Copolymer | 31.71 |
| Plasticizer | 18.93 |
| Clay | 24.68 |
| Peanut hulls | 24.68 |

Example 2

| | |
|---|---|
| Copolymer | 22.57 |
| Plasticizer | 20.72 |
| Clay | 40.24 |
| Peanut hulls | 16.46 |

Example 3

| | |
|---|---|
| Copolymer | 33 |
| Clay | 10 |
| Peanut hulls | 57 |

In all the examples, the copolymer found most suitable is non-toxic vinyl resin. A suitable resin of this kind is a stabilized copolymer of vinyl acetate and vinyl chloride, the two being in the ratio of approximately 15% and 85% by weight respectively. A commercial stabilized copolymer of vinyl acetate and vinyl chloride in the proportions noted is sold under the trade name of "Sterilkote," a product of Bradley & Vrooman Company of Chicago, Illinois. Other copolymers of vinyl acetate and vinyl chloride in the appropriate proportions noted may also be used. For example, the "Vinylites," Series V, can be used. Other suitable vinyl resins may be used.

The plasticizers suitable for use in the examples are phthalyl glycollates such as:

(a) Methyl phthalyl ethyl glycollate

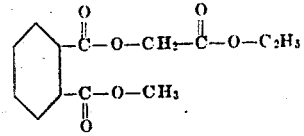

a commercial embodiment of which is "Santicizer M-17," a product of Monsanto Chemical Co. of St. Louis, Missouri;

(b) Butyl phthalyl butyl glycollate

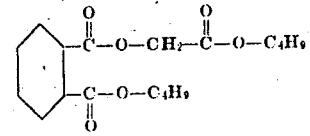

a commercial embodiment of which is "Santicizer B-16," also a product of Monsanto Chemical Company; and (c) Ethyl phthalyl ethyl glycollate

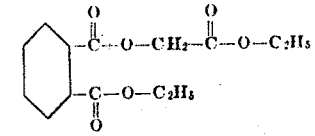

a commercial embodiment of which is "Santicizer E-15" also a product of Monsanto Chemical Company.

Other non-toxic plasticizers useful with the copolymers mentioned may be employed. For example, dibutyl phthalate

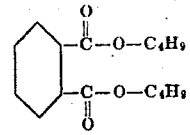

and tricresyl phosphate ("ortho free," non-toxic)

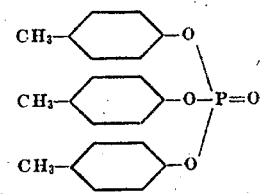

also may be used. Other suitable plasticizers also may be used.

The clays particularly useful in the formula are the so-called china clay (kaolin) and Dawson clay, the china clay being preferable.

The nutshells or hulls preferably are peanut shells or hulls freed of all nut meat and ground into small particles of bran-like size. Other nut shells or plant by-products having similar characteristics are contemplated. "Peanut Hull Bran," a commercial product can be used.

In preparing the compositions according to any of the examples the procedure may be of the following types:

A. The clay and vinyl resin or copolymer in the proportions mentioned in one of the various examples together with a part of the peanut hulls previously ground to a bran or fine-sized particles are placed in a mixer #1. This mixer is of the blade type whose blades act like those of a heavy dough machine that pull and cut at the mass therein. A suitable mixer or mill is the so-called "Baker Perkins" mixer. The ingredients added to this mixer are thoroughly dispersed thereby. During the mixing the temperature in the mixer rises to about 190° F. While the dispersion is taking place the plasticizer is added up to the amount specified for that one of the respective examples being prepared and mixing continues until the contents are tacky or sticky. If desired, the walls of the mixer may be artificially heated in any suitable way up to about 180° F. Care is taken throughout the mixing to prevent a rise in temperature of the contents of the mixer above 200° F.

B. The contents of mixer #1 are then removed and transferred a small amount at a time to a similar mixer #2 in the form of lumps. The same temperature conditions are maintained in mixer #2 as in mixer #1. When the contents of mixer #2 becomes sufficiently soft and pliable as to stretch in rubber-like manner between the blades of the mixer #2, the balance of the shells or hulls necessary to make up the proportionate quantity specified for that one of the respective examples being prepared is added slowly and in small quantities at a time to produce a thorough dispersion thereof in the contents of mixer #2. After the final quantity of shells or hulls has been introduced, mixing continues in mixer #2 for an additional five to ten minutes. The total mixing time in mixers #1 and #2 is approximately thirty minutes. The final product is removed in the form of "chunks" or lumps of thoroughly mixed resin, plasticizer, clay, and shells or hulls.

B-1. In the alternative, mixer #2 may be dispensed with and the balance of the shells or hulls added slowly and in small quantities at a time to the contents of mixer #1 when the latter has acquired such softness, and pliability as to stretch in rubber-like manner between the blades of said mixer #1. If only one mixer is used the total mixing time therein also is about thirty minutes. The final product is the same as that using mixers #1 and #2.

C. The final products of steps B or B-1 as lumps or chunks while still warm or after being thoroughly cooled are fed directly to a roller mill R, such as those used in rubber mills or plants, and rolled by the rollers thereof into rough sheets. If the lumps or chunks resulting from steps B or B-1 cool before their introduction to the rolling mill R during transportation thereto in the same plant, or during transportion to another plant having the rolling mill, they may be reheated to approximately 180° F. by an appropriate heater H. The latter may be a suitably heated room or oven whose temperatures are carefully controlled. The rolling of the warm or reheated chunks or lumps between the rollers creates frictional heat which is useful in maintaining the temperature of the material being rolled above 180° F. Care is taken, however, by use of appropriate cooling medium circulating, for example, through various of the rollers to prevent any rise of temperature above about 200° F. The rolling of the chunks in the mill R by the rolls thereof not only serves to flatten the chunks into rough sheet form, but further serves to compress and knead the chunks like dough to smoother and more uniform consistency. To this end, the material is passed through the rolls of mill R from four to eight times.

D. The rough sheets that finally emerge from the rolling mill R are transferred to a suitable calender C wherein they are further kneaded and rolled by the calender rolls into sheets of the desired thickness. The calender rolls likewise develop frictional heat which is suitably controlled as by cooling fluid passing through the rolls to prevent a temperature rise above approximately 200° F. in the sheets.

The finished emerging sheets S of the composition may then be stamped out into gasket discs 10 (Fig. 10), or rings 11 (Fig. 11) or into any other suitably shaped gaskets by suitable stamping punches P or the like.

E. Another way of preparing and mixing the ingredients of Examples 1, 2 and 3 is to place resin and clay only in the proportions set forth in that of the respective examples desired in a mixer #1a, like mixer #1 previously described, and during mixing therein adding to the mix plasticizer of the kind and in the proportions set forth in that example being prepared until a sticky, tacky product results. Care is taken as before to maintain the temperature during mixing between about 180° F. and 200° F. The mixed contents of mixer #1a are removed as "chunks" or lumps of "gasket compound," containing solely the resin or copolymer, clay and plasticizer, if any, in the proportions set forth in that of the respective Examples 1, 2 and 3 being prepared. These chunks of "gasket compound" constitute an intermediate product that may be combined either at the same plant or elsewhere with the peanut shells or hulls.

E-1. One way is to introduce the "chunks" of intermediate product into a heated mixer #2a of the same type as mixer #2 previously described or of similar type, such as a so-called "Banbury" mixer. The latter like mixer #2 has beater blades that cut and knead the contents. The temperature within this mixer also is carefully controlled to prevent any temperature use in the contents above about 200° F. and preferably between 180° F. and 200° F. When the intermediate product has become sufficiently soft and pliable as to stretch in rubber-like manner between the blades of the mixer #2a the hulls or shells necessary to make up the proportionate quantities set forth in that of the respective examples being prepared is added slowly and in small quantities at a time to produce a thorough dispersion thereof in the contents of said mixer #2a. When the final small quantity of shells or hulls has been added, mixing continues for five or ten minutes thereafter in mixer #2a. The contents of mixer #2a is then identical with the final products of steps B or B-1 previously described and may be treated by steps C and D described above to produce the finished sheets S.

E-2. Another way of combining the chunks of "gasket compound" with the shells or hulls is to take the chunks of "gasket compound" produced by mixer #1a and deliver them to a rolling mill Ra, similar to mill R, and to roll the chunks into rough sheets. The friction of the rolling operation heats the rough sheets but the temperature is controlled to prevent a rise above 200° F. The rough rolling, also, presses and kneads the "gasket compound" into uniformity and delivers the warm rough sheets to the mixer #2b. The latter is similar to mixers #2 and #2a. In the mixer #2b, the rough sheets are cut up by the mixer blades which cut and knead them further. The temperature here, too, is maintained within the limits previously specified. When the rough sheets have become a soft and pliable mass that stretches in rubber-like manner between the blades, hulls or shells necessary to make up the proportionate quantities specified in that of the respective examples being prepared are added slowly and in small quantities at a time to produce a thorough dispersion thereof in the contents of mixer #2b. After the final small quantity of shells or hulls has been added mixing continues for five or ten minutes in mixer #2b. The contents of the latter is then like the final products of steps B or B–1 or E–1 and may be treated by the steps C and D described above to produce finished sheets S.

Instead of subjecting the hull- or shell-bearing compositions produced in any of the ways described above to the action of rolling mills R or calenders C, such compositions in the form of "chunks" may be fed directly from the last mixer (Fig. 5) to a suitable hydraulic press P of any conventional construction, in which such chunks are pressed under high pressure while heated or cold. The friction or pressure develops heat to make the material pliable. The chunks are shaped while heated between 180° F. and not exceeding 200° F. into final sheet form S. Instead of pressing into sheets, the press P may have molds of any appropriate shape to press the "chunks" directly into discs 10, rings 11, or into any other desired form. The press may be used, too, to press the "chunks" or pack them into cylindrical rods K (Fig. 7) from which gasket discs 10a may subsequently be sliced in appropriate slicing apparatus.

One great advantage of the compositions herein described is that all waste is eliminated. Any excess composition resulting from the stamping or molding processes may be reprocessed in the mills R and calenders C, or press P to produce additional sheets S or directly molded discs 10 or the like.

If the disc 10 is to be used as a gasket for a crown cap 12, it has a diameter of approximately 1 and 1/16 inches and a thickness of approximately 0.100 to 0.030 inch, or more or less as desired.

It is found that the product embodying the composition of Examples 1, 2 or 3 is normally slightly adherent to the touch at usual room temperatures. This adhesiveness is usually sufficient to maintain it in proper position within a crown cap 12. On the other hand, if desired, the disc may be adhered suitably within the cap. Suitable adherents are gutta percha (if available), albuminous binders such as those now used in the preparation of cork composition discs, tasteless glue, tasteless cement made from coal tar products, proteins, resin, glycerine and casein. A specifically suitable glue is "Casco" powdered casein glue, manufactured by Casein Co. of America, Div. The Borden Co., New York. Any other suitable adherent which will serve the purpose without harmful effect on the resilient properties of the disc 10 or the bottle's content may be used.

In certain instances, to save material, the disc 10 may be replaced by the ring 11 in the crown cap 12. The cut-out central portion 11a has a diameter approximately equal to that of the internal diameter at the mouth of the bottle. The sealing properties of a ring 11 have been found to be satisfactory for the retention of the carbonizing gas in the beverage within the bottle. This ring 11 may be adhered to the cap 12 in any of the ways in which the disc 10 is adhered thereto.

In Fig. 9, 13 represents the threaded neck of a tooth paste tube or other container fitted with a screw cap 14. A sealing gasket 10b of the same material as disc 10a is provided. A ring similar to ring 11 could be substituted.

The compositions of matter set forth in Examples 1, 2 and 3 and prepared in any of the ways herein described are available for a large variety of uses, some of which have been indicated in this specification. Other uses will be apparent to those skilled in the art.

Another method of preparing a shell- or hull-bearing composition of matter suitable for use as gaskets for crown caps or the like is to prepare the product from ingredients in the following proportions:

| | |
|---|---|
| Water _____ c.c._ | 10 |
| Gelatin _____ grams_ | 2 |
| Glycerine _____ c.c._ | 3 |
| Formaldehyde (40% solution) _____ c.c._ | 0.3 |
| Peanut hulls ground and sifted through 18–20 mesh screen, or of bran-like size _____ grams | 10 |
| Ammonia solution (26%) _ _ drops or minims_ | 5 |

The glycerine is added to the water and the mixture heated to approximately 80° C. The gelatin is added to the warmed mixture and while maintaining the temperature of about 80° C. the latter is allowed to stand until the gelatin has dissolved completely therein. Then the formaldehyde solution is added and the mixture is stirred thoroughly. Thereafter, while the resulting binder mixture is still warm and fluid, the peanut shells or hulls are thoroughly stirred into the binder mixture. Then the ammonia solution is added and rapidly stirred into the mix. The peanut hull bearing product of these steps is then pressed into rods under pressure of about 10,000 lbs./sq. in. The rods are then dried and gaskets of the desired thickness are sliced or otherwise cut from them. In the alternative, the peanut hull bearing product may be pressed into sheets in hydraulic presses under the same pressure (10,000 lbs./sq. in.). After drying, gasket discs or other forms of gaskets or other articles may be stamped from the sheets. Or else, the hydraulic presses may be provided with molds to produce directly the final desired form of the product.

When the compositions of matter, particularly the synthetic resin types herein described, are used for wire insulation they may be shaped into strips and have an adherent similar to that used on insulating tapes applied to one face prior to wrapping about the wire, or else the strips may be heated slightly before wrapping about the wire and will adhere without any additional adhesive.

While preferred compositions and procedural steps have been described herein, it is to be understood that variations in practice within the scope of the claims is contemplated. There is no intention of limitation to the exact details shown and described.

What is claimed is:

1. A composition of matter containing approximately 33%–22.57% by weight of a copolymer of vinyl acetate and vinyl chloride, up to approximately 20.72% by weight of plasticizer, approximately 10%–40.24% by weight of clay and approximately 57%–16.46% by weight of ground peanut hulls or shells.

2. As an article of manufacture, a gasket for use with a container closure or the like comprising a mixture containing approximately 31.71% by weight of copolymerized vinyl acetate and vinyl chloride, approximately 18.93% by weight of plasticizer, approximately 24.68% by weight of china clay and approximately 24.68% by weight of ground peanut shells or hulls.

3. As an article of manufacture, a gasket for use with a container closure or the like comprising a mixture containing approximately 22.5% by weight of copolymerized vinyl acetate and vinyl chloride, approximately 20.72% by weight of plasticizer, approximately 40.24% by weight of china clay and approximately 16.46% by weight of ground peanut shells or hulls.

4. In the process of making a composition of matter, the steps comprising intimately mixing copolymerized vinyl acetate-vinyl chloride resin, plasticizer and approximately 10% to approximately 40.24% by weight of china clay while maintaining a temperature range lying between approximately 180° F. and 200° F. to produce a mass, rolling said mass as chunks of material into rough sheets, cutting up and mixing said rough sheets at a temperature within said range, adding thereto and intimately mixing therewith ground peanut shells or hulls, and compressing the product while maintaining said temperature range to produce sheets of said composition of matter.

HERMAN M. KULMAN.

REFERENCES CITED

The following references are of record in the file of this patent:

UNITED STATES PATENTS

| Number | Name | Date |
| --- | --- | --- |
| 1,356,784 | Oltmans | Oct. 26, 1920 |
| 2,041,217 | Smithers et al. | May 19, 1936 |
| 2,307,180 | Yngve | Jan. 5, 1943 |
| 2,319,182 | Van der Pyl | May 11, 1943 |